April 14, 1931.  P. EDLICH  1,800,515

CLIP CHAIN FOR TENTERING MACHINES

Filed April 18, 1929  3 Sheets-Sheet 1

Paul Edlich. INVENTOR

Paul Edlich. Inventor

April 14, 1931.   P. EDLICH   1,800,515
CLIP CHAIN FOR TENTERING MACHINES
Filed April 18, 1929   3 Sheets-Sheet 3
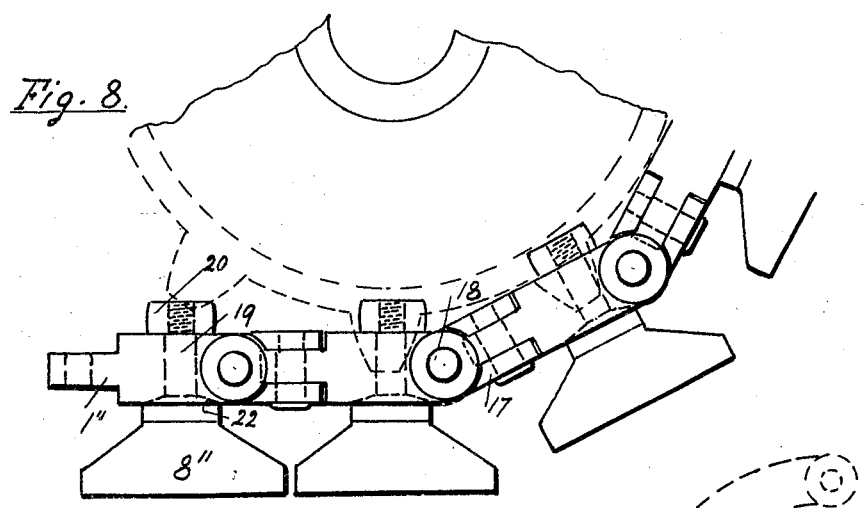
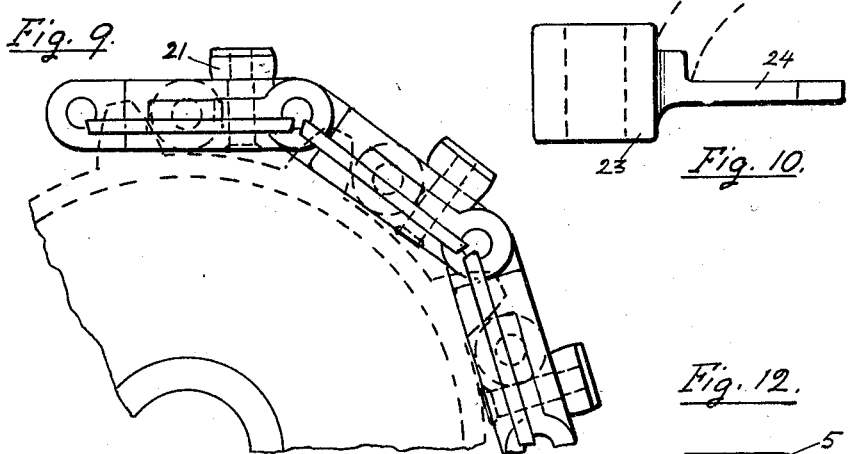
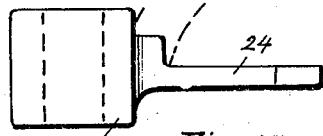
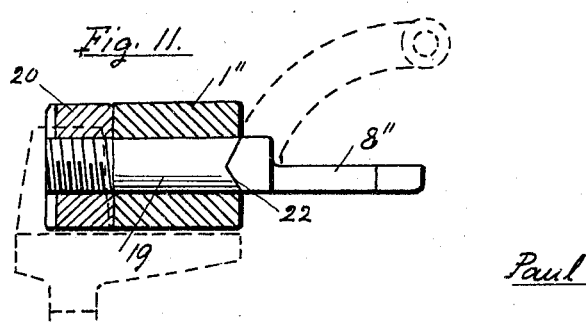
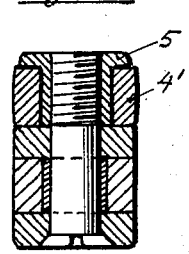
Paul Edlich, INVENTOR Patented Apr. 14, 1931

1,800,515

UNITED STATES PATENT OFFICE

PAUL EDLICH, OF DELAWANNA, NEW JERSEY

CLIP CHAIN FOR TENTERING MACHINES

Application filed April 18, 1929. Serial No. 356,269.

This invention relates to improvements in tenter machines, the general object of the invention being to so construct the clip chain that it can be driven and passed over or around horizontally and vertically arranged sprockets without changing the relative positions of the clips with the links.

Another object of the invention is to make the clips detachable from the links so that if a link should wear out, the clip can be attached to the substitute link or vice versa.

Another object of the invention is to so connect the clip with the link that the clip can be removed without disconnecting the link from the adjacent links.

A still further object of the invention is to provide interchangeable projecting rollers on the chain which are adapted to be engaged by the teeth of the sprockets.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 8 is a view showing a further modification, showing the chain passing over horizontally arranged sprockets.

Figure 9 is a view of the chain shown in Figure 8, passing over vertically arranged sprockets.

Figure 10 is a view showing a chain and clip formed integral with each other.

Figure 11 is a sectional view through a link provided with a detachable clip which can be removed without disconnecting the link from the adjacent links and showing portion of the sprocket in dotted lines.

Figure 12 is a sectional view through the joint between two links, with a roller carried by the nut of the pivotal bolt.

Referring to Figures 1 to 4, the chain A is composed of a plurality of links 1, each link being connected with the two adjacent links by the pivots 2 and 3 which are arranged at right angles to each other, whereby the chain can pass over horizontally and vertically arranged sprockets B. The pivotal bolts carry the rollers 4 which are arranged at one side of the chain and are adapted to be engaged by the teeth of the sprockets.

Figure 3:
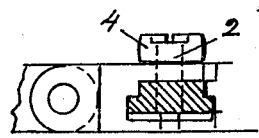
Figure 3 is a section on line 3—3 of Figure 1.

Figure 3 shows a roller carried by the head of a bolt so that by removing the bolt, a new roller can be substituted for a worn one.

Figure 12 shows a roller 4' carried by the nut 5 of the pivotal bolt. Each sprocket B is formed with a flange 6 at one side thereof and the teeth 7 are arranged at the opposite side, the flange and teeth carrying portion forming a peripheral space for receiving the links of the chain and the projecting portions of the bolts or the nuts which are not engaging the teeth.

Figure 1:
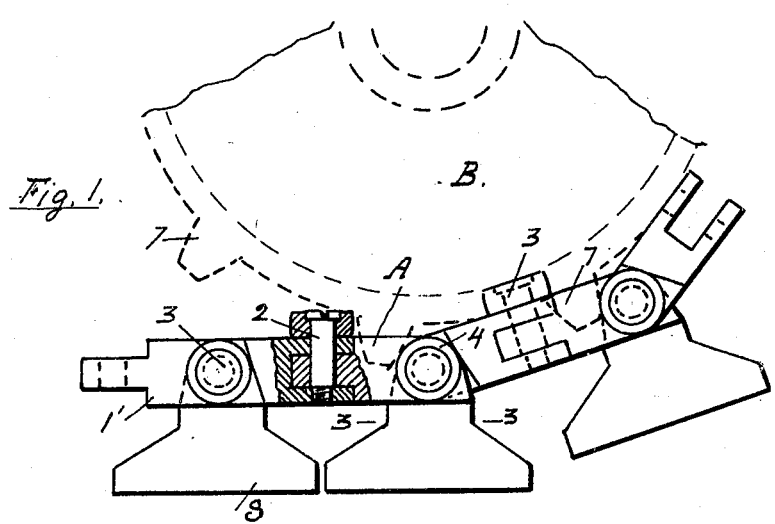
Figure 1 is a fragmentary top plan view, showing portions of the chain passing around a horizontally arranged sprocket.
Figure 2:
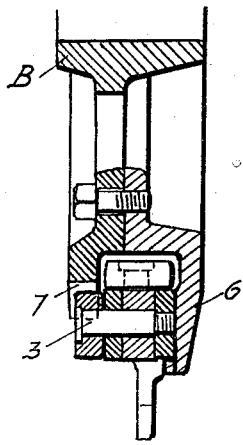
Figure 2 is a sectional view through Figure 1, showing the chain passing over horizontally arranged sprockets.
Figure 4:
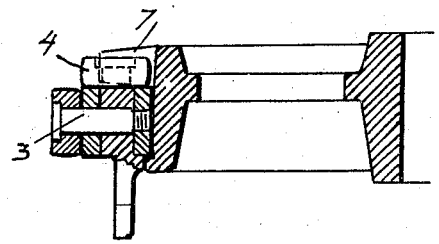
Figure 4 is a view similar to Figure 2, but showing the chain passing over a vertically arranged sprocket.

The clips 8 are detachably connected with the chain. Figures 1, 2 and 4 showing these clips as being connected with the bolts 3.

Figure 5:
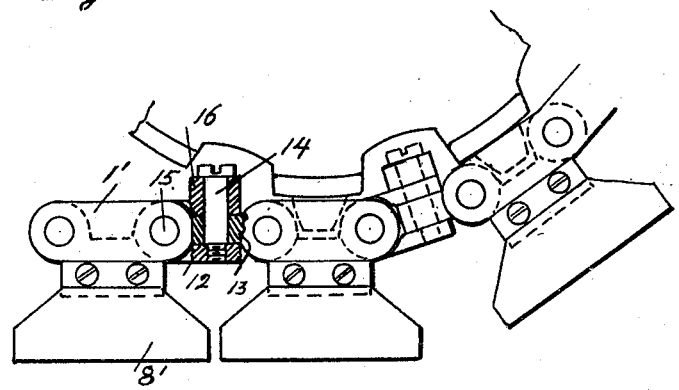
Figure 5 is a view similar to Figure 1, but showing a modification.
Figure 7:
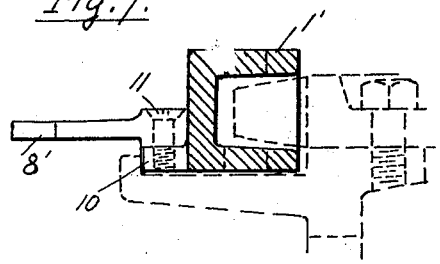
Figure 7 is a fragmentary sectional view showing a chain in engagement passing over horizontally arranged sprockets.
Figure 6:
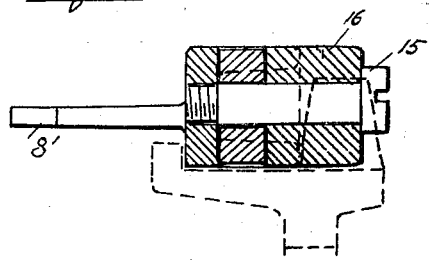
Figure 6 is an end view, with parts in section, of one of the links of the chain shown in Figure 5.

Figures 5, 6 and 7 show the clips 8' connected with extensions 10 on the links 1' by screws or bolts 11, and these figures also show the links 1' connected together by a socketed link 12 and a tongue carrying link 13 which are pivotally connected together by a bolt 14 which is arranged at right angles to the bolts or pins 15 which connect the links 12 and 13 with the links 1'. The links 12 are formed with the projections 16 through which the bolts 14 pass so that these projections can be engaged by the teeth of some of the sprockets, the teeth of other sprockets entering the space formed in the links 1' between the bosses at the ends of the links which receive the bolts or pins 15. Thus this arrangement permits the chain to pass over either horizontal or vertical sprockets. In this arrangement, the clips are fastened to the main links 1' at the sides thereof, instead of by means of some of the pivotal bolts, as in the first form.

Figures 8 and 9 show the main links 1" connected together by a short link 17, each link 17 being pivoted to the two adjacent main links by pivots 18 which are arranged at right angles to each other. The clips 8" are connected with the bolts 19 which pass through holes formed in the main links. The nuts are engaged by the teeth of some of the sprockets and the nuts 21 or the rollers carried thereby, of some of the bolts or pins 18 being engaged by the teeth of the oppositely arranged sprockets. In order to prevent the clips from turning, their inner portions are provided with beveled tongues 22 for engaging beveled notches in the links.

Figure 10 shows a link 23 with a clip 24 formed integral therewith.

Figure 11 shows a link 1" with a clip 8" connected with the bolt 19 and nut 20.

From the foregoing it will be seen that the chain, with the links arranged as specified, can readily pass over both the horizontally and vertically arranged sprockets of the machine and that the clips can be removed from the worn links and attached to the substitute links or vice versa, and by providing the rollers on the tooth engaging parts of the chain, friction will be reduced to the minimum.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:—

1. A chain adapted to be engaged by the teeth of vertically and horizontally disposed sprockets comprising units severally adapted to be engaged by consecutive teeth of said sprockets, vertically and horizontally pivoted hinges upon each of said units, and tentering clips pivoted onto said chain in fulcrums arranged transversely to said chain.

2. A chain adapted to be engaged by the teeth of vertically and horizontally disposed sprockets comprising units making up said chain, each unit comprising vertically and horizontally pivoted rollers which respectively are adapted to be engaged by consecutive teeth of said horizontally and vertically disposed sprockets, vertically and horizontally pivoted hinges upon each of said units, and tentering clips pivoted onto said chain in fulcrums arranged transversely to said chain.

3. In combination with a universally jointed chain of the kind described, members extending from adjoining sides of said chain, horizontally disposed sprockets, the teeth of which are adapted to engage upon said members extending from one side of said chain, faces upon said horizontally disposed sprockets adapted to support sides of said chain opposite to said side from which extend the members adapted to be engaged by the teeth of said horizontally disposed sprockets, and tentering members radially extending in a horizontal plane from said chain when the said chain is engaged upon said horizontally disposed sprocket.

4. In combination with a universally jointed, substantially square chain, members outwardly extending from two adjoining sides of said chain, said members extending from each of said sides being adapted to engage between the teeth of a sprocket when a respectively adjoining side of said chain peripherally rests upon the circumference of said sprocket, and tentering clips extending from said chain from a side opposite to one of said sides of said chains, from which extend some of said members.

5. In combination with a universally jointed chain, two sets of means right angularly disposed on said chain and longitudinally offset in respect to each other, each of said sets of means being adapted to engage upon the teeth of a sprocket, and tentering clips laterally extending from said chain.

6. In combination with a universally jointed chain, two sets of means right angularly disposed on said chain in respect to each other, each of said sets of means being adapted to engage upon the teeth of a sprocket, studs transversely mounted in said chain, and tentering clips supported by one coextensive set of said studs and adapted to tenter goods disposed in a plane parallel to the axis of the studs of said set.

Signed at Passaic, in the county of Passaic and State of New Jersey, this 17th day of April, A. D. 1929.

PAUL EDLICH.